United States Patent
Michel

(10) Patent No.: US 7,874,561 B2
(45) Date of Patent: Jan. 25, 2011

(54) HEIGHT ADJUSTMENT DEVICE FOR MOTOR VEHICLES

(75) Inventor: Wilfried Michel, Riedenburg (DE)

(73) Assignee: Audi AG, Ingolstadt (DE)

( * ) Notice: Subject to any disclaimer, the term of this patent is extended or adjusted under 35 U.S.C. 154(b) by 385 days.

(21) Appl. No.: 12/048,422

(22) Filed: Mar. 14, 2008

(65) Prior Publication Data
US 2009/0045595 A1 Feb. 19, 2009

(30) Foreign Application Priority Data
Mar. 14, 2007 (DE) .................. 10 2007 012 202

(51) Int. Cl.
*B60R 17/00* (2006.01)
(52) U.S. Cl. ............................................. 280/6.157
(58) Field of Classification Search .......... 280/5.514, 280/6.15, 6.153, 6.157
See application file for complete search history.

(56) References Cited

U.S. PATENT DOCUMENTS 7,237,780 B2 * 7/2007 Ohki ...................... 280/6.157
2006/0163863 A1 * 7/2006 Ellmann et al. ............ 280/788
2007/0210539 A1 * 9/2007 Hakui et al. ............. 280/5.514

FOREIGN PATENT DOCUMENTS

| DE | 195 10 032 | | 9/1996 |
| DE | 195 10 032 | A1 | 9/1996 |
| DE | 101 44 111 | A1 | 3/2003 |
| EP | 1 479 542 | A | 11/2004 |
| EP | 1 681 187 | A | 7/2006 |
| FR | 2 840 257 | A | 12/2003 |
| JP | 2001 301436 | | 10/2001 |
| JP | 2005 106106 | | 4/2005 |
| JP | 2005 188613 | A | 7/2005 |
| JP | 2005188613 | A * | 7/2005 |
| WO | WO 2006/012858 | | 2/2006 |

* cited by examiner

*Primary Examiner*—Paul N Dickson
*Assistant Examiner*—Robert A Coker
(74) *Attorney, Agent, or Firm*—Novak Druce + Quigg

(57) ABSTRACT

The invention relates to a height adjustment device for motor vehicles that is arranged between a height-adjustable spring plate of a support spring of a wheel suspension assembly and the vehicle body and in which a drive motor cooperates via a shifted gear with a control sleeve that is mounted in a rotational fashion to adjust the height of the spring plate. According to the invention, the shifted gear connected between the drive motor and the control sleeve is arranged inside the control sleeve.

8 Claims, 2 Drawing Sheets

HEIGHT ADJUSTMENT DEVICE FOR MOTOR VEHICLES

CROSS-REFERENCE TO RELATED APPLICATIONS

This application claims priority from German Application No. 102007012202.2 filed Mar. 4, 2007, hereby incorporated by reference in its entirety.

The invention relates to a height adjustment device for motor vehicles.

BACKGROUND OF THE INVENTION

A height adjustment device of the generic type is known, for example, from DE 195 10 032 C2. In this device, a telescopic shock absorber, a helical support spring and a threaded drive with a control sleeve, a nut, and rolling elements inserted therebetween are combined into one unit. Here, the upper end of the support spring is located below the threaded drive, causing the unit to have a relatively large overall length.

The control sleeve of the height adjustment device described above is rotationally actuated by means of an external drive motor. However, the gear connection between the drive motor and the control sleeve is realized such that it has a high space requirement. Thus, the control sleeve has an exterior gearing on its upper face that meshes with a drive pinion of the electric motor. A rotationally secured guide sleeve, upon which the control sleeve is mounted in a rotatable fashion, is located radially inside the control sleeve.

The object of the invention is to provide a height adjustment device of the generic type that requires less installation space and that may be installed in a motor vehicle in a structurally favorable fashion and, optionally, may be retrofitted.

SUMMARY OF THE INVENTION

According to the invention, the gear speed connected between the drive motor and the control sleeve is not located outside of the control sleeve, but rather inside it. In this manner, the space required for the height adjustment device is reduced, particularly in the radial direction. In this manner, a drive connection may be made in an advantageous fashion between the gear speed and the control sleeve via an internal gearing. In comparison to an exterior gearing, an internal gearing of this type has a considerably larger gearing coverage, which is favorable in view of stability and noise emission.

Preferably, the gear speed may be a spur gear speed that may be produced in a simple fashion and requires little installation space inside the control sleeve, having gear wheels with an external tooth system. In order to further reduce the space requirements, the adjuster for the drive motor may be arranged in the remaining free space inside the control sleeve.

Advantageously, a drive pinion of the drive motor, preferably an electric motor, may be positioned inside the control sleeve and directly or indirectly cooperate with an internal gear set of the control sleeve. Here, the control sleeve may be part of a ball screw whose ball nut is arranged radially outside the control sleeve and inside the support spring. Thus, it is possible for the height adjustment device to also be embodied in a particularly short fashion, such that it may even optionally be retrofitted. By means of the radially interior actuator (drive pinion, internal gearing of the control sleeve), the control sleeve and therefore the ball nut may have a greater diameter inside the support spring such lower actuating forces are necessary and the robustness of the ball screw is increased.

Here, it is particularly favorable from a production standpoint for the axially adjustable spring plate to be formed above the ball screw on the corresponding face of the ball nut.

Furthermore, it is advantageous for the ball nut to be guided in a positive fashion onto a section of the guide sleeve via a ring flange extending radially inwards in the circumferential direction. This may be accomplished, for example, by a serration between the section of the guide sleeve and the ring flange.

Moreover, it is possible for the drive pinion of the electric motor to be driven in an advantageous fashion directly by way of an intermediate gear wheel on the internal gearing of the control sleeve. In this manner, it is possible for the gear transmission ratio between the electric motor and the ball screw drive as well as for the spatial position of the electric motor to be optimally adapted to the structural conditions.

The housing of the device may preferably be formed by an assembly-side base plate and a radially interior guide sleeve, with the control sleeve being rotationally mounted on the guide sleeve by way of two roller bearings located at an axial distance from one another. This results in a particularly construction that is robust and simple to produce with a precise function of the ball screw. The roller bearings may be, for example, commercially available tapered roller bearings.

Moreover, the drive shaft of the electric motor carrying the drive pinion and/or the intermediate gear wheel may be rotationally mounted in the base plate of the housing. In so doing, it is possible for the electric motor to be disposed in a structurally and spatially favorable manner inside the guide sleeve and below the base plate.

Alternately, however, the electric motor may be arranged above the base plate of the housing in such a way that it protrudes into the hollow space of a neighboring longitudinal chassis beam of the structure of the motor vehicle or at least is positioned adjacent to the longitudinal chassis beam. The electric motor as a part of the height adjustment device is thus arranged in a particularly protected and vibration stable fashion.

It is particularly advantageous for the electric motor, the housing, the ball screw, and the spring plate connected to its ball nut to form one unit that may be attached to the support spring.

Moreover, it is possible for one elastic rubber dust boot each to be provided between the base plate of the housing and the adjustable spring plate as well as between a lower radial flange of the guide sleeve and the rotationally symmetric outer circumference of the ball nut, which would protect the mechanically movable parts of the height adjustment device from moisture and soiling.

In another exemplary embodiment, the ball nut may also be arranged radially outside of the control sleeve, but with the axially adjustable spring plate being formed below the ball screw on the corresponding face of the ball nut and the ball nut thus being arranged above the support spring and, there, the ball nut not exceeding the inner diameter of the support spring in a projection in the direction of the central axis of the spring.

BRIEF DESCRIPTION OF THE DRAWINGS

Exemplary embodiments of the invention are described in greater detail below.

DETAILED DESCRIPTION OF THE PREFERRED EMBODIMENTS OF THE INVENTION

Figure 1:
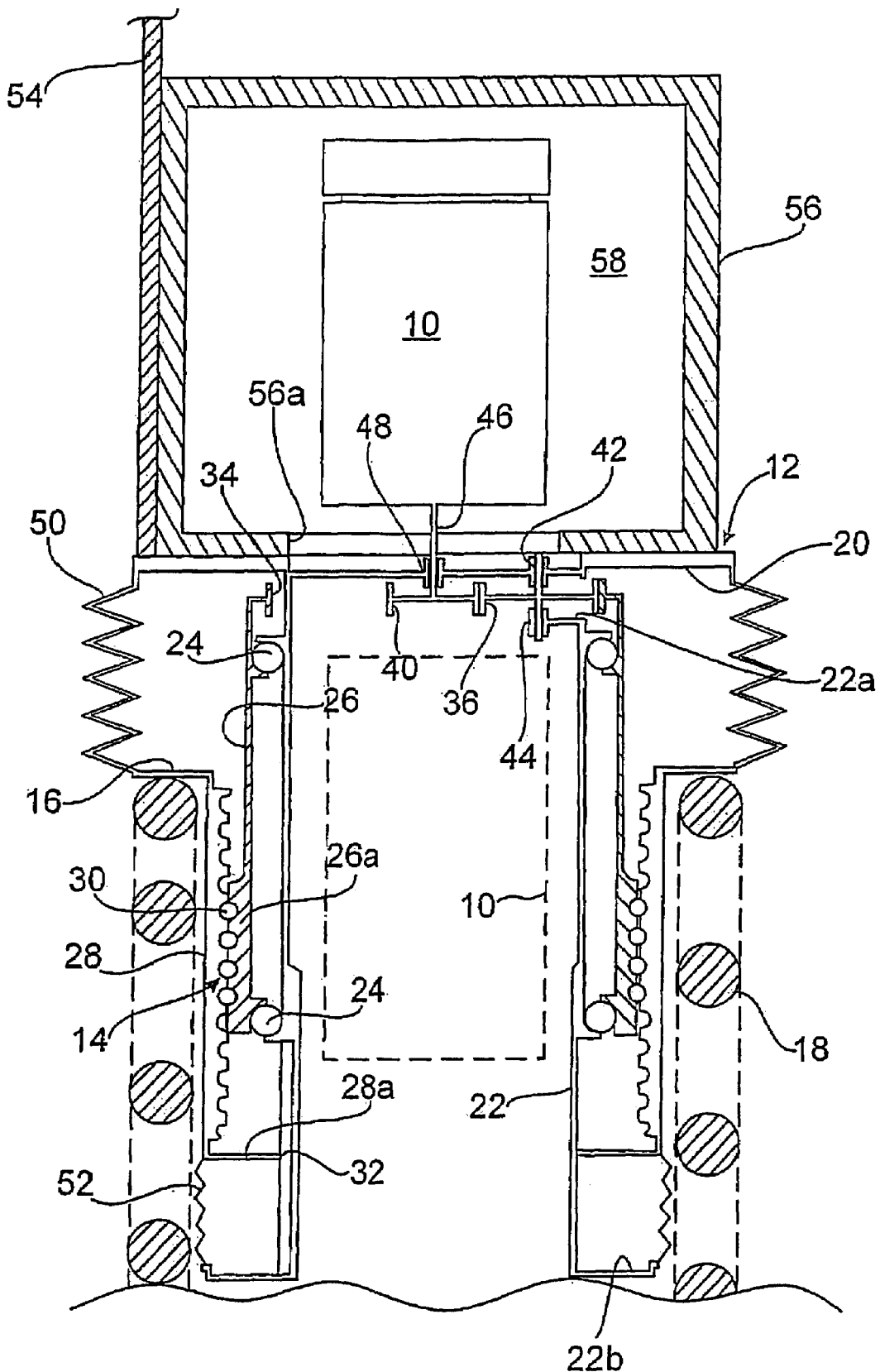
FIG. 1 shows a rough schematic section in a vertical plane transverse relative to the vehicle running through the central axis of a helical support spring of a height adjustment device that has been arranged on an assembly-side longitudinal chassis beam of the motor vehicle.

The height adjustment device for setting various level positions of the motor vehicle on a rear wheel suspension assembly is essentially composed of an electric motor 10, a housing 12, and a ball screw 14 on which an annular spring plate 16 is arranged as the assembly-side support for a support spring 18 (helical compression spring).

The support spring 18 is supported on the other side by a transverse control arm of the wheel suspension assembly, which is not shown and to which a telescopic shock absorber adjacent to the support spring 18 may optionally also be connected. The support may also occur directly on the wheel bearing.

The housing 12 of the height adjustment device is formed from an upper, disc-shaped base plate 20 and a guide sleeve 22 formed thereon that projects downwards.

The radially interior control sleeve 26 of the ball screw 14 is mounted on the guide sleeve 22 in a rotational fashion on via two roller bearings 24 or tapered roller bearings located at an axial distance from one another, as may be seen, but also in an axially fixed fashion.

The control sleeve 26 has on its outer circumference a section 26a of helical ball tracks (no reference character) that cooperate with the ball tracks worked into the inner circumference of the ball nut 28 of the ball screw 14 on and balls 30 arranged there between in a manner known in ball screws.

A ring flange 28a projecting radially inwards is formed on the lower end of the ball nut 28; this ring flange is guided onto the guide sleeve 22 in a positive manner via a locking device, generally designated with the number 32.

As may be seen from the drawing, the spring plate 16 is formed on the upper face of the ball nut 28 such that the ball screw 14 is located inside the support spring 18.

A gear wheel with an internal gear set 34 is arranged on the control sleeve 26 in the vicinity of the upper roller bearing 24; this gear set is connected in a driving fashion to the drive pinion 40 of the electric motor 10 via an intermediate gear wheel 36. As may be seen, the drive pinion 40 and the intermediate gear wheel 36 are located inside the control sleeve 26, with the intermediate gear wheel 36 extending through an opening 22a in the guide sleeve 22.

The intermediate gear wheel 36 is mounted in a rotational fashion via bearings 42, 44 on the base plate 20 and on the guide sleeve 22. The drive pinion 40 and/or its drive shaft 46 is also mounted in a rotational fashion in the base plate 20 via a bearing 48; however, bearing of the drive pinion may also be arranged in the housing of the electric motor 10, which is attached to the base plate 20 of the housing 12 in a manner that is not shown. In the latter case, instead of the bearing 48, an opening would need to be provided for the drive pinion 40.

As may be seen, an elastic rubber dust boot 50 is arranged between the base plate 20 of the housing 12 and the adjustable spring plate 16. Another dust boot 52 extends between a lower radial flange 22b of the guide sleeve 22 and the rotationally symmetrical outer circumference of the ball nut 28 of the ball screw 14.

The height adjustment device as described is embodied as one unit which, as may be seen from the drawing, may be placed on the support spring 18 and may be mounted with this support spring (and/or with the entire wheel suspension assembly, which is not shown) on the body of the motor vehicle.

The body, which is only implied here, has a section 54 of the rear wheel housing shell and a longitudinal chassis beam 56 adjacent thereto. Here, the base plate 20 of the height adjustment device is fastened to the bottom of the longitudinal chassis beam 56 via screw connections, which are not shown, with the electric motor 10 protruding through an opening 56a of the longitudinal chassis beam 56 into the free hollow space 58 of the longitudinal chassis beam 56.

Because the ball screw 14 and the gear drive connected upstream of it do not cooperate in a self-locking fashion with the drive pinion 4, the intermediate gear wheel 36, and the internal gear set 34 on the control sleeve 26, an electromagnetically controlled brake is provided in the electric motor that brakes the drive pinion 40 if the electric motor is currentless. Moreover, an angle encoder is provided as a measurement device by means of which the momentary position of the ball nut 28 (corresponds to the level of the vehicle) may be detected and evaluated with control technology relative to the control sleeve 26 and/or relative to the body 54, 56 of the motor vehicle.

By means of the at least one intermediate gear wheel 36, the position of the electric motor 10 with its gear pinion 40 may be displaced relative to the base plate 20 of the housing 12 depending on the structural conditions and, optionally, the transmission ratio may be changed as well.

When the electric motor 10 is activated, the control sleeve 26 is turned in one direction or the other via the gear drive with the drive pinion 40, the intermediate gear wheel 36, and the internal gear set 34, whereby the ball nut 28 with the spring plate 16 is axially displaced. Depending on the charge and load on the vehicle, this leads to a change in level or to a stronger initial tension (or vice versa) of the support spring 18.

In this manner, it is possible to control pitch and rocking compensation in a manner that is known per se.

Deviating from the exemplary embodiment, an electric motor 10 may also be arranged and fastened below the base plate 20 of the housing 12, as is shown in dashed lines in FIG. 1.

Figure 2:
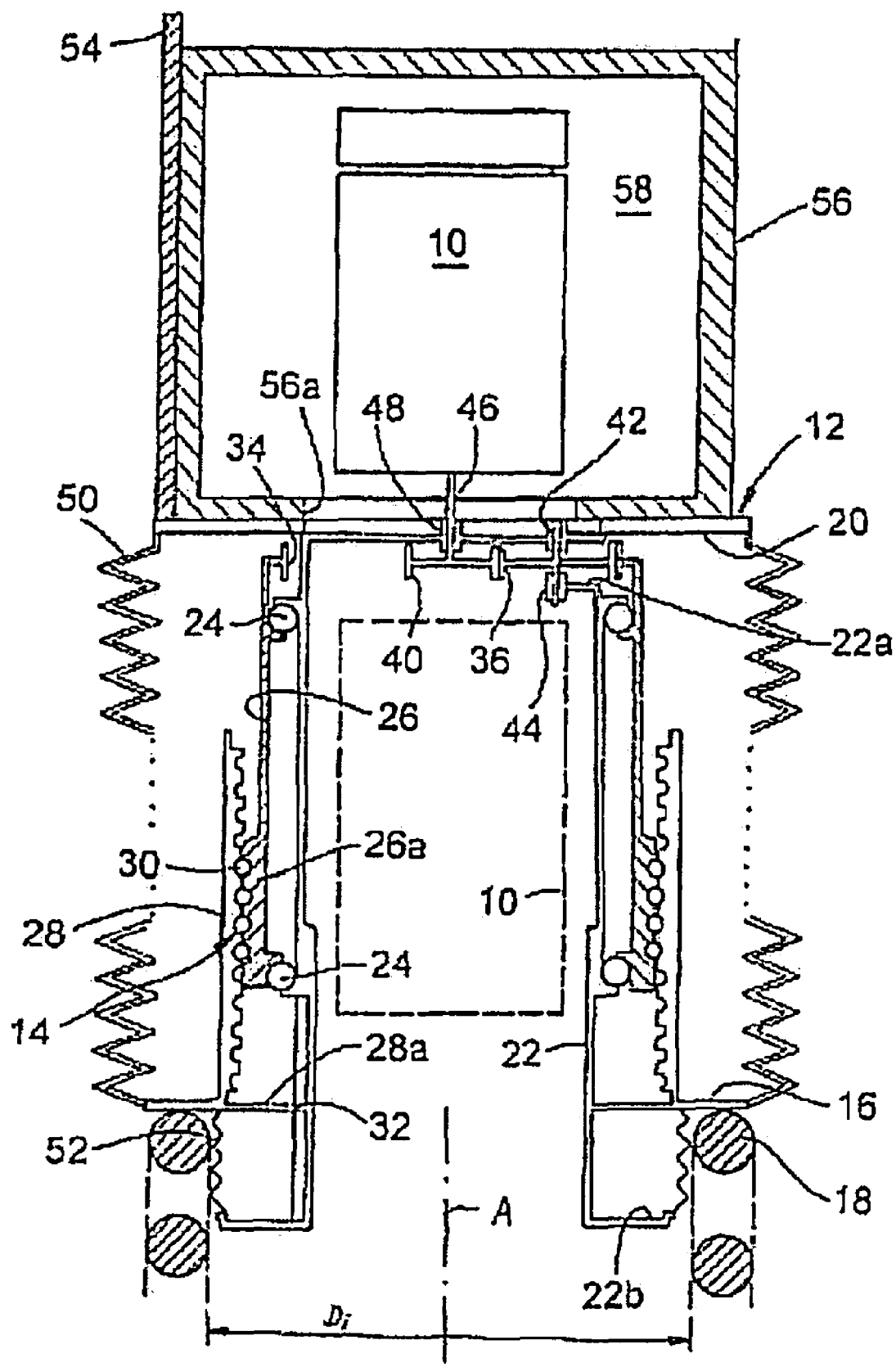
FIG. 2 section analogous to FIG. 1, with the ball nut being arranged above the spring, but not exceeding the inner diameter of the spring at a projection in the direction of the central axis of the spring.

FIG. 2 shows a section on the same basis as in FIG. 1.

The ball nut 29 is arranged radially outside of the control sleeve 27.

However, the axially adjustable spring plate 16 is formed below the ball screw 14 on the corresponding face of the ball nut 29.

In this manner, the ball nut 29 is arranged above the support spring 18. If a projection of the support spring 18 occurs in this position of the ball nut 29 in the direction of the central axis A, it may be seen that the ball nut 29 is located inside the internal diameter $D_i$ of the support spring 18.

The remaining technical features of FIG. 1 may also be found in FIG. 2.

The invention claimed is:

1. A height adjustment assembly for a vehicle having a wheel suspension assembly and a body, comprising:
   a guide member supportable on said body;
   a coil spring mountable on a component of said wheel suspension assembly;
   a first sleeve rotatably mounted on said guide member;
   a second sleeve disposed coaxially with said first sleeve, mounted on said coil spring and provided with a ball screw connection with said first sleeve;
   a motor supported on said body; and means for transmitting torque from an output shaft of said motor to said first sleeve.

2. An assembly according to claim 1 wherein said guide member is provided with a cylindrical outer surface and said second sleeve is provided with an inwardly disposed flange guideable along said surface.

3. An assembly according to claim 1 wherein said second sleeve is provided with an annular flange seated on said coil spring.

4. An assembly according to claim 1 wherein said motor comprises an electric motor.

5. An assembly according to claim 1 wherein said torque transmitting means comprises a gear train.

6. An assembly according to claim 1 wherein said motor is mounted on said body.

7. An assembly according to claim 1 wherein said motor is mountable within said guide member.

8. An assembly according to claim 1 wherein said motor includes an output shaft disposed coaxially with said first and second sleeve.

\* \* \* \* \*